(12) United States Patent
Belew et al.

(10) Patent No.: US 8,874,676 B2
(45) Date of Patent: Oct. 28, 2014

(54) ROLLING VIEW VIRTUALIZATION

(71) Applicant: AT&T Intellectual Property I, L.P., Atlanta, GA (US)

(72) Inventors: Douglas Belew, Campanilla, CA (US); Michael Mocettini, Carmichael, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/655,098

(22) Filed: Oct. 18, 2012

(65) Prior Publication Data

US 2013/0073658 A1    Mar. 21, 2013

Related U.S. Application Data

(63) Continuation of application No. 12/343,698, filed on Dec. 24, 2008, now Pat. No. 8,316,093.

(51) Int. Cl.
  *G06F 15/16* (2006.01)
  *G06Q 10/10* (2012.01)
  *G07B 17/00* (2006.01)

(52) U.S. Cl.
  CPC ........ *G07B 17/00024* (2013.01); *G06Q 10/107* (2013.01); *G07B 2017/00153* (2013.01); *G07B 2017/00491* (2013.01)
  USPC ............ 709/206; 700/223; 705/406; 705/410

(58) Field of Classification Search
  USPC .................... 709/206; 700/223; 705/406, 410
  See application file for complete search history.

(56) References Cited

U.S. PATENT DOCUMENTS

| | | |
|---|---|---|
| 5,805,810 A | 9/1998 | Maxwell |
| 6,604,132 B1 | 8/2003 | Hitt |
| 6,631,400 B1 | 10/2003 | DiStefano, III |
| 6,697,843 B1 * | 2/2004 | Carlin et al. .................. 709/206 |
| 6,993,562 B2 | 1/2006 | Treptow et al. |
| 7,265,853 B1 | 9/2007 | Kara et al. |
| 2001/0010494 A1 | 8/2001 | Herbert |
| 2002/0184064 A1 | 12/2002 | Schnurmann et al. |
| 2004/0044734 A1 | 3/2004 | Beck |
| 2004/0085568 A1 * | 5/2004 | Sesek et al. .................. 358/1.15 |
| 2005/0160147 A1 | 7/2005 | Denney et al. |
| 2006/0242247 A1 | 10/2006 | Richardson |
| 2008/0086369 A1 * | 4/2008 | Kiat et al. ........................ 705/14 |
| 2009/0077183 A1 | 3/2009 | Bruce et al. |

(Continued)

OTHER PUBLICATIONS

Belew; Final Office Action mailed Apr. 28, 2011 for U.S. Appl. No. 12/343,685, filed Dec. 24, 2008.
Belew; Final Office Action mailed Feb. 16, 2011 for U.S. Appl. No. 12/343,687, filed Dec. 24, 2008.

(Continued)

*Primary Examiner* — Thomas Dailey
(74) *Attorney, Agent, or Firm* — Wolff & Samson, PC

(57) ABSTRACT

Rolling view optimization is initiated by receiving electronic mail data corresponding to a plurality of mail pieces, the electronic mail data including a first cycle and determining whether substantially all electronic mail data from the first cycle can be processed for mailing. In response to determining that substantially all of the electronic mail data from the first cycle cannot be processed for mailing, a determination is made whether a portion of the mail data from the first cycle can be processed for mailing and in response to determining that a portion of the mail data from the first cycle can be processed for mailing the electronic mail data corresponding to the first cycle for mailing is sent.

14 Claims, 7 Drawing Sheets

(56) References Cited

U.S. PATENT DOCUMENTS

2009/0089378 A1    4/2009  Maresh
2009/0228558 A1    9/2009  Brenner
2009/0313060 A1*  12/2009  Evevsky .......................... 705/7
2010/0049536 A1*   2/2010  Quine et al. ..................... 705/1

OTHER PUBLICATIONS

Belew; Non-Final Office Action mailed Sep. 1, 2010 for U.S. Appl. No. 12/343,687, filed Dec. 24, 2008.
Belew; Non-Final Office Action mailed Nov. 23, 2010 for U.S. Appl. No. 12/343,685, filed Dec. 24, 2008.

* cited by examiner

ROLLING VIEW VIRTUALIZATION

This application is a continuation of U.S. patent application Ser. No. 12/343,698, filed on Dec. 24, 2008, which is incorporated herein by reference in its entirety.

BACKGROUND

In distributing large quantities of mail pieces to large numbers of recipients, coordination and efficiency can become difficult to obtain. As a nonlimiting example in corporate mailing centers, mailing can become a logistical challenge due to the large number of national and/or multi-national recipients. Additionally, many current solutions fail to coordinate distribution of mail from mailing sources to output centers and generally adhere to strict cycle-based mail processing. As a nonlimiting example, some current solutions direct mailing data from mailing sources directly to output centers. Similarly, some current solutions process mail in a 1-to-1 roll to pallet configuration, as well as adhere each mail job to a corresponding cycle. As a result such solutions fail to efficiently generate and/or process mailing.

SUMMARY

Included are embodiments for rolling view optimization. At least one embodiment of a method includes receiving electronic mail data corresponding to a plurality of mail pieces, the electronic mail data including a first cycle and determining whether substantially all electronic mail data from the first cycle can be processed for mailing. Some embodiments include in response to determining that substantially all of the electronic mail data from the first cycle cannot be processed for mailing, determining whether a portion of the mail data from the first cycle can be processed for mailing and in response to determining that a portion of the mail data from the first cycle can be processed for mailing, sending the electronic mail data corresponding to the first cycle for mailing.

Also included are embodiments of a system. At least one embodiment includes a memory component that stores logic configured to receive electronic mail data corresponding to a plurality of mail pieces, the electronic mail data including a first cycle and logic configured to determine whether substantially all electronic mail data from the first cycle can be processed for mailing. Some embodiments are configured with the memory component storing logic configured to, in response to determining that substantially all of the electronic mail data from the first cycle cannot be processed for mailing, determine whether a portion of the mail data from the first cycle can be processed for mailing and logic configured to, in response to determining that a portion of the mail data from the first cycle can be processed for mailing, send the electronic mail data corresponding to the first cycle for mailing.

Also included are embodiments of a computer-readable that include a program that, when executed by a computer is configured to cause the computer to receive electronic mail data corresponding to a plurality of mail pieces, the electronic mail data including a first cycle and determine whether substantially all electronic mail data from the first cycle can be processed for mailing. Similarly, some embodiments are configured such that the program causes the computer to in response to determining that substantially all of the electronic mail data from the first cycle cannot be processed for mailing, determine whether a portion of the mail data from the first cycle can be processed for mailing and in response to determining that a portion of the mail data from the first cycle can be processed for mailing, send the electronic mail data corresponding to the first cycle for mailing.

Other embodiments and/or advantages of this disclosure will be or may become apparent to one with skill in the art upon examination of the following drawings and detailed description. It is intended that substantially all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

One should also note that at least some embodiments disclosed in U.S. application Ser. No. 12/343,685, entitled "Mail Manufacturing Virtualization" and Ser. No. 12/343,687, entitled "Batch Size Optimization, are included within the scope of this disclosure, as both of these applications are incorporated by reference in there entireties.

DETAILED DESCRIPTION

Figure 1:
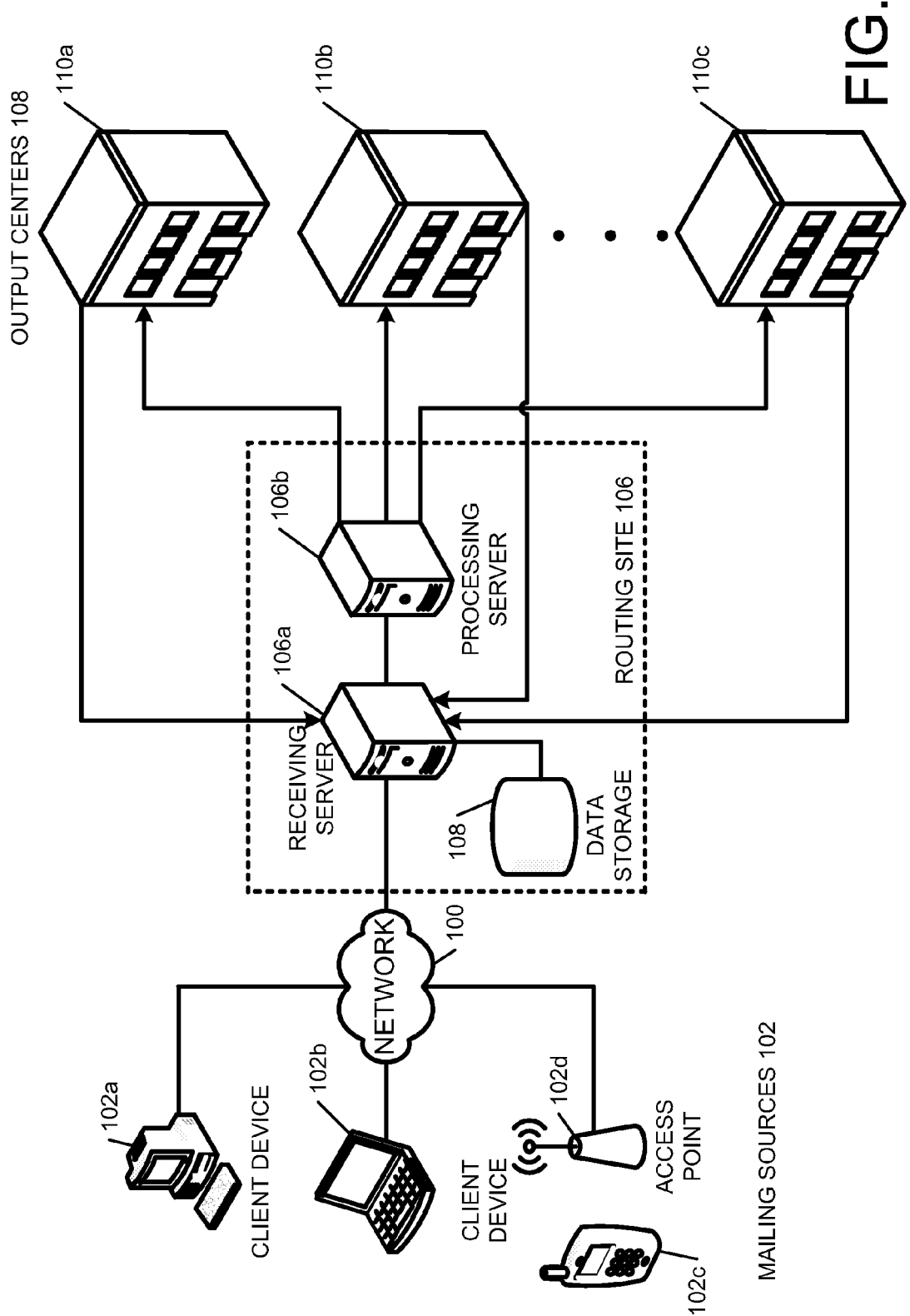
FIG. 1 depicts an exemplary embodiment of network configuration, illustrating a plurality of devices that may be used for sending mail to at least one output center.

FIG. 1 depicts an exemplary embodiment of network configuration, illustrating a plurality of devices that may be used for sending mailing data to at least one output center. As illustrated in the nonlimiting example of FIG. 1, one or more mailing sources 102 may be utilized to send mailing data (and/or metadata) for processing and sending to the post office. The mailing sources 102 may include one or more client devices 102a, 102b, and 102c, which may be implemented as personal computers (e.g., 102a), laptop computers (e.g., 102b), and/or mobile devices (e.g., 102c) that utilize wireline and/or wireless communications protocols, such as via an access point 102d. Additionally, while not explicitly illustrated, mailing sources may utilize one or more other devices, such as servers, routers, modems, etc.

In operation, the mailing sources 102 may be configured to determine pieces of mail that can be distributed to mail recipients. More specifically, in an exemplary embodiment, the mailing sources 102 may be remotely located sites that determine billing data for customers. Each of the remotely located mailing sources 102 may determine the billing data for a predetermined set of customers based on any number of criteria, including geographic area of the customer, class of customer, and/or other criteria. The billing data can be compiled by each of the remotely located sites to create mailing data (and/or metadata) and sent, via a network 100, to a routing site 106.

The network 100 may include a wide area network (WAN), such as the Internet, public switched telephone network (PSTN), mobile communications network, and/or other WAN. Similarly, in some embodiments, the network 100 can include a local area network (LAN) and/or other network. The network 100 may be configured to receive the mailing data from the mailing sources 102 for distribution to the routing site 106.

Additionally, the routing site 106 may be configured as a centrally located site for receiving and processing mailing data. As a nonlimiting example, the routing site 106 may include a receiving server 106a and a processing server 106b. In operation, the receiving server 106a may be configured to receive mailing data (and/or metadata) from at least one of the mailing sources 102. The receiving server 106a may also be configured to store at least a portion of the mailing data (and/or metadata) received from the mailing sources 102. Storage of the mailing data (and/or metadata) may be facilitated by a data storage component 108, which may be part of the receiving server and/or, as illustrated in FIG. 1, as an external component that is coupled the receiving server 106a.

Additionally, the receiving server 106a may be coupled to the processing server 106b. The processing server 106b may be configured to receive data from the receiving server 106a. Additionally, the processing server 106b may be configured to determine a technique for determining distribution of the mailing data (and/or metadata) to one or more outputting centers 110. As a nonlimiting example, the processing server 106b can receive an algorithm for determining desired routing for the mailing data (and/or metadata). The algorithm may be received from a user and/or administrator (e.g., via a client device at the routing cite 106, via a client device coupled to the network 100, etc.) and may be based on a service level agreement (SLA), material requirements for the mailing data and/or metadata (e.g., the mail requires a certain size and/or type of paper that is only provided by a subset of the output centers), personnel resources at the output center 110, capacity of one or more of the output centers 110, mail cost for sending mail from one or more of the output centers 110, etc.

Also included in the nonlimiting example of FIG. 1 are the output centers 110. The output centers 110 may be located separately from each other and may each be configured to receive the mailing data (and/or metadata) from the processing server 106b. The output centers 110 may be configured to generate physical mail based on the received mailing data (and/or metadata) and send the generated physical mail to a post office for mailing. Additionally, the output centers 110 may be configured to determine which mail is properly processed and/or received by an intended recipient and report this determination back to the receiving server 106a. From this data, the receiving server 106a and/or processing server 106b may reprocess this data with newly received mailing data (and/or metadata) to redistribute to the output centers 110.

Figure 2:
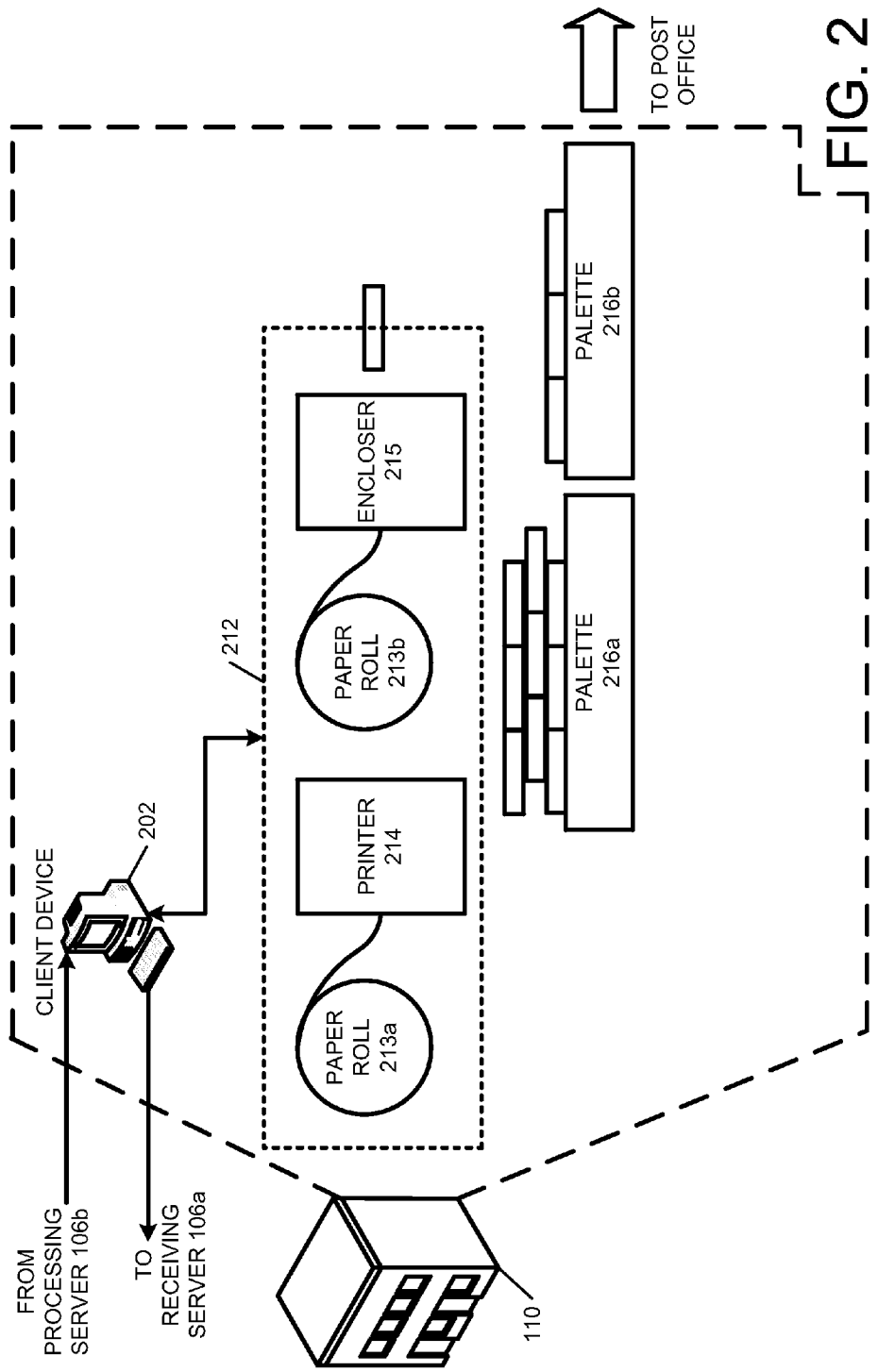
FIG. 2 depicts an exemplary embodiment of an output center, similar to output centers from FIG. 1.

FIG. 2 depicts an exemplary embodiment of an output center, such as at least one of the output centers 110 from FIG. 1. As illustrated in the nonlimiting example of FIG. 2, one or more of the output centers 110 may include a client device 202 and a mail processing component 212. The client device 202 may be coupled to the receiving server 106a and the processing server 106b. Additionally, the client device 202 may be coupled to the mail processing component 212. The mail processing component may include a plurality of paper rolls 213a and 213b a printer 214, and an encloser 215.

In operation, the client device 202 may receive mailing data according to one or more cycles (e.g., billing cycles). As described in more detail below, the cycles may be delineated according to mailing deadlines; however this is not a requirement. The mailing deadlines may correspond to each piece of mail and/or according to a cycle, as a whole. In at least one exemplary embodiment, one or more of the cycles may divide the entire mail data according to a day each particular mail piece is due for mailing. Similarly, some embodiments may be configured to categorize mail into cycles according to other criteria (e.g., by month, week, hour, by type of mail, and/or other criteria). Additionally, upon receiving the mailing data, the mail processing component 212 may facilitate printing and enclosing of the mailing data for mailing with the post office. The enclosed mail may be packaged in palettes 216a, and 216b.

Generally speaking many current solutions process one paper roll 213b per palette and one cycle per batch. Additionally, many current solutions utilize one cycle (e.g., billing cycle) for processing job. As processing time and energy is primarily spent during setup and shut down, by adhering to strict processing configurations, great inefficiencies are realized and errors can occur.

Figure 3:
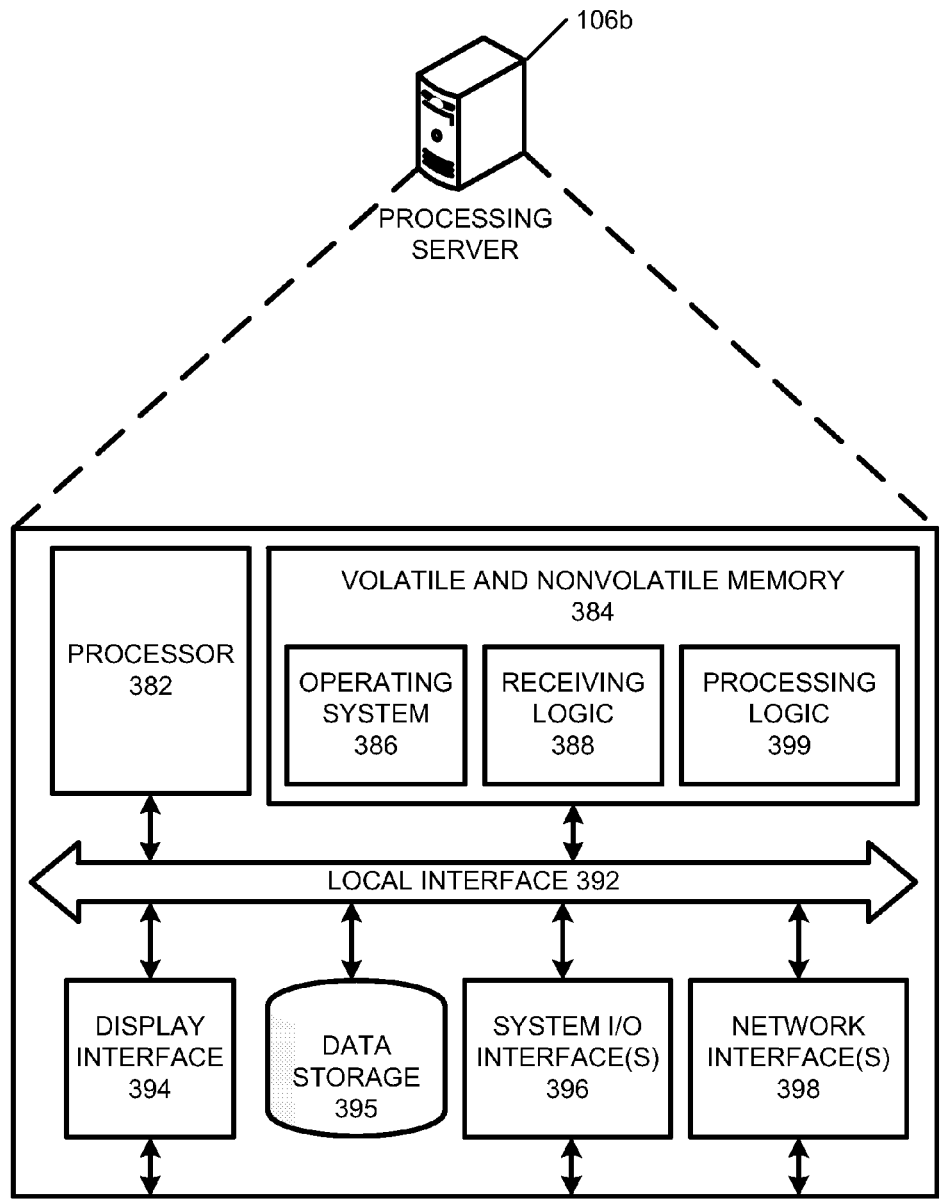
FIG. 3 depicts an exemplary embodiment of a processing server that may be configured to operate in the environment of FIG. 1.

FIG. 3 depicts an exemplary embodiment of a processing server 106b that may be configured to operate in the environment of FIG. 1. Although a wire-line device (e.g., the processing server 106b) is illustrated, this discussion can be applied to wireless devices (and/or other devices), as well. According to exemplary embodiments, in terms of hardware architecture, the processing server 106b includes a processor 382, a memory component 384, a display interface 394, data storage 395, one or more input and/or output (I/O) device interface(s) 396, and/or one or more network interfaces 398 that are communicatively coupled via a local interface 392. The local interface 392 can include, for example but not limited to, one or more buses and/or other wired or wireless connections. The local interface 392 may have additional elements, which are omitted for simplicity, such as controllers, buffers (caches), drivers, repeaters, and receivers to enable communications. Further, the local interface 392 may include address, control, and/or data connections to enable appropriate communications among the aforementioned components. The processor 382 may be a device for executing software, particularly software stored in the memory component 384. The processor 382 can include any custom made or commercially available processor, a central processing unit (CPU), an auxiliary processor among several processors associated with the processing server 106b, a semiconductor based microprocessor (in the form of a microchip or chip set), a macroprocessor, and/or generally any device for executing software instructions.

The memory component 384 can include any one or combination of volatile memory elements (e.g., random access memory (RAM, such as DRAM, SRAM, SDRAM, etc.)) and/or nonvolatile memory elements (e.g., flash memory, read only memory (ROM), hard drive, tape, CDROM, etc.). Moreover, the memory component 384 may incorporate electronic, magnetic, optical, and/or other types of storage media. One should note that the memory component 384 can have a distributed architecture (where various components are situated remote from one another), but can be accessed by the processor 382.

The software in the memory component 384 may include one or more separate programs, which may include an ordered listing of executable instructions for implementing logical functions. In the example of FIG. 3, the software in the memory component 384 may include receiving logic 388 and processing logic 399 (which may include one or more logical components that are executed by a processor), as well as an operating system 386. The operating system 386 may be configured to control the execution of other computer programs and provides scheduling, input-output control, file and data management, memory management, and communication control and related services. The receiving logic 388 may be configured to receive mailing data (and/or metadata), as described in more detail below. Additionally, processing logic 399 may be configured to facilitate communication of the mailing data (and/or metadata) to one or more output centers, as also described in more detail, below.

In at least one embodiment, the receiving logic 388 and processing logic 399 may be configured as a system component and/or module embodied as software and may also be construed as a source program, executable program (object code), script, and/or any other entity that includes a set of instructions to be performed. When constructed as source programs, the receiving logic 388 and processing logic 399 may be translated via a compiler, assembler, interpreter, or the like (which may or may not be included within the memory component 384) so as to operate properly in connection with the operating system 386.

The input/output devices that may be coupled to the system I/O interface(s) 396 may include input devices, for example but not limited to, a keyboard, mouse, scanner, touch screen, microphone, etc. Further, the input/output devices may also include output devices, for example but not limited to, a printer, display, speaker, etc. Additionally, the input/output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

Additionally included are one or more of the network interfaces 398 for facilitating communication with one or more other devices. More specifically, network interface 398 may include any component configured to facilitate a connection with another device. While in some embodiments, among others, the processing server 106b can include the network interface 398 that includes a personal computer memory card international association (PCMCIA) card (also abbreviated as "PC card") for receiving a wireless network card, this is a nonlimiting example. Other configurations can include the communications hardware within the processing server 106b, such that a wireless network card is unnecessary for communicating wirelessly. Similarly, other embodiments include the network interfaces 398 for communicating via a wired connection. Such interfaces may be configured with Universal Serial Bus (USB) interfaces, serial ports, and/or other interfaces.

If the processing server 106b includes a personal computer, workstation, or the like, the software in the memory component 384 may further include a basic input output system (BIOS) (omitted for simplicity). The BIOS is a set of software routines that initialize and test hardware at startup, start the operating system 386, and support the transfer of data among the hardware devices. The BIOS is stored in ROM so that the BIOS can be executed when the processing server 106b is activated.

When the processing server 106b is in operation, the processor 382 may be configured to execute software stored within the memory component 384, to communicate data to and from the memory component 384, and to generally control operations of the processing server 106b pursuant to the software. Software in the memory component 384, in whole or in part, may be read by the processor 382, perhaps buffered within the processor 382, and then executed.

One should also note that while the description with respect to FIG. 3 includes the processing server 106b as a single component, this is a nonlimiting example. More specifically, in at least one exemplary embodiment, the processing server 106b can include a plurality of servers, personal computers, telephones, and/or other devices. Similarly, while the description of FIG. 3 describes the processing server 106b as a server device, this is also a nonlimiting example. More specifically, depending on the particular exemplary embodiment, other components, such as the client device 102c and/or the access point 102d may include similar elements and/or logic.

Additionally, while the receiving logic 388 and the processing logic 399 are each illustrated in FIG. 3 as including a single software component, this is also a nonlimiting example. In at least one embodiment, the receiving logic 388 may include one or more components, embodied in software, hardware, and/or firmware. Similarly, in at least one embodiment, the processing logic 399 may include one or more components, embodied in software, hardware, and/or firmware. Additionally, while the receiving logic 388 and the processing logic 399 are depicted as residing on a single device, such as the processing server 106b, the receiving logic may reside on one or more devices (e.g., receiving server 106a) and the processing logic 399 may also reside on one or more different devices (e.g., processing server 106b). As a nonlimiting example, in some exemplary embodiments, the receiving logic 388 may reside on the receiving server 106a and the processing logic 399 may reside on the processing server 106b. However this is not a requirement.

Figure 4A:
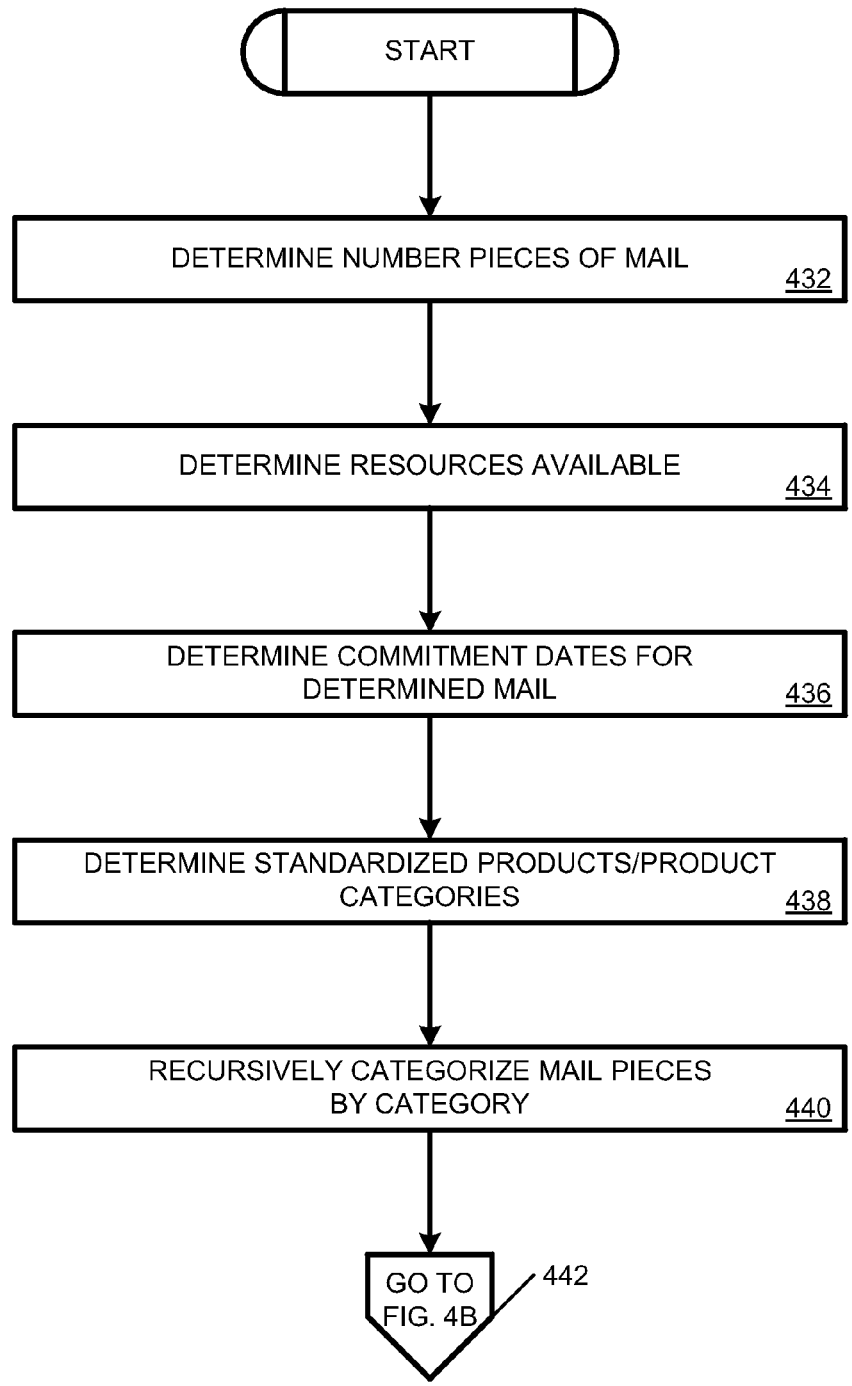
FIGS. 4A-4B illustrate an exemplary flowchart for processing mail, such as in the environments from FIGS. 1 and 2.
Figure 4B:
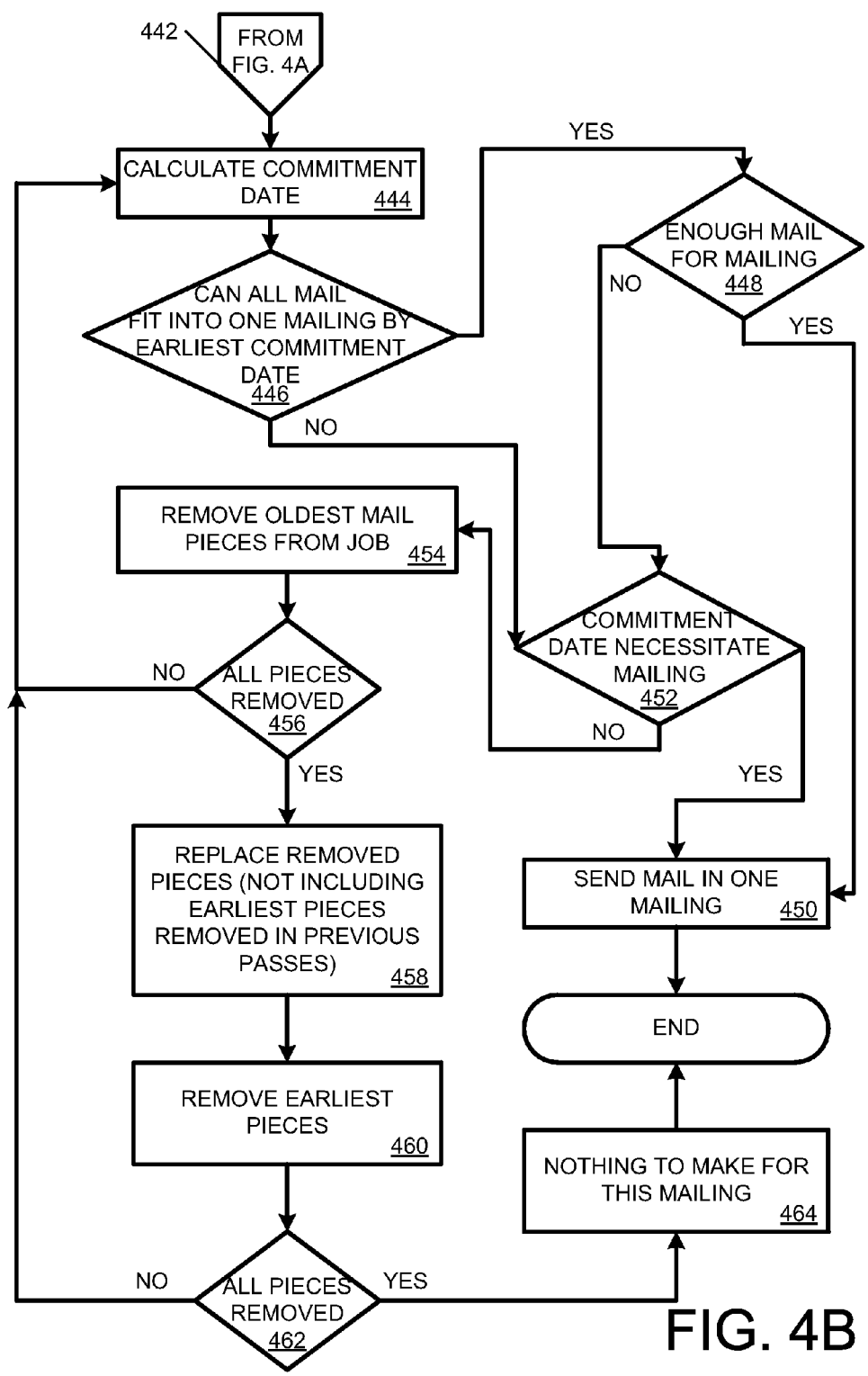

FIGS. 4A-4B illustrate an exemplary flowchart for processing mail, such as in the environments from FIGS. 1 and 2. As illustrated in the nonlimiting example of FIG. 4A, the processing server 106b may determine a number of pieces of mail for a particular mailing job (block 432). The processing server 106b may also determine resources available for processing the particular mailing job (block 434). The resources may include the output centers 110 and the capacity for those output centers 110 to generate and process mail from received mailing data.

Additionally, the processing server 106b can determine commitment dates for the determined mail (block 436). As discussed above, each piece of the mail data may have a commitment date. Accordingly, the processing server 106b can determine an overall commitment date for the entire job. The processing server 106b can determine standardized products and/or product categories (block 438). As a nonlimiting example, the processing server 106b may determine that the categories include paper-type mail and non-paper-type mail. Other categories may also be determined. The processing server 106b can additionally recursively categorize mail pieces by the determined category (block 440). The process then proceeds to jump block 442.

FIG. 4B illustrates a continuation of the exemplary process from FIG. 4A. As illustrated in the nonlimiting example of FIG. 4B, the processing server 106b can calculate a commitment date for the received job (block 444). A determination can be made regarding weather all mail of the job can fit into one mailing by the earliest commitment date (block 446). If so, a determination can be made regarding whether there is enough mail in this job for mailing (block 448). If there is enough mail for mailing, the processing server 106b can send the mail in one mailing (block 450).

If, at block 448, there is not enough mail for mailing or if, at block 446 all mail cannot fit into one mailing by the earliest commitment date, a determination can be made regarding whether a commitment data necessitates mailing of the job (block 452). If, so the process returns to block 450 to send the mail in one mailing. If, however, no commitment date necessitates a mailing, the oldest mail pieces can be removed from the job (block 454). A determination can then be made regarding whether all mail pieces have been removed (block 456). If not, the process returns to block 444 to determine a commitment date of the job without the removed mail. If, however, all the mail pieces have been removed, the removed mail pieces can be replaces (not including the earliest pieces removed in previous passes), as illustrated in block 458. The earliest pieces can then be removed (block 460). A determination can then be made whether all mail pieces have been removed (block 462). If not, the process returns to block 444. If however, all pieces have been removed, there is nothing to produce for mailing (block 464).

Figure 5:
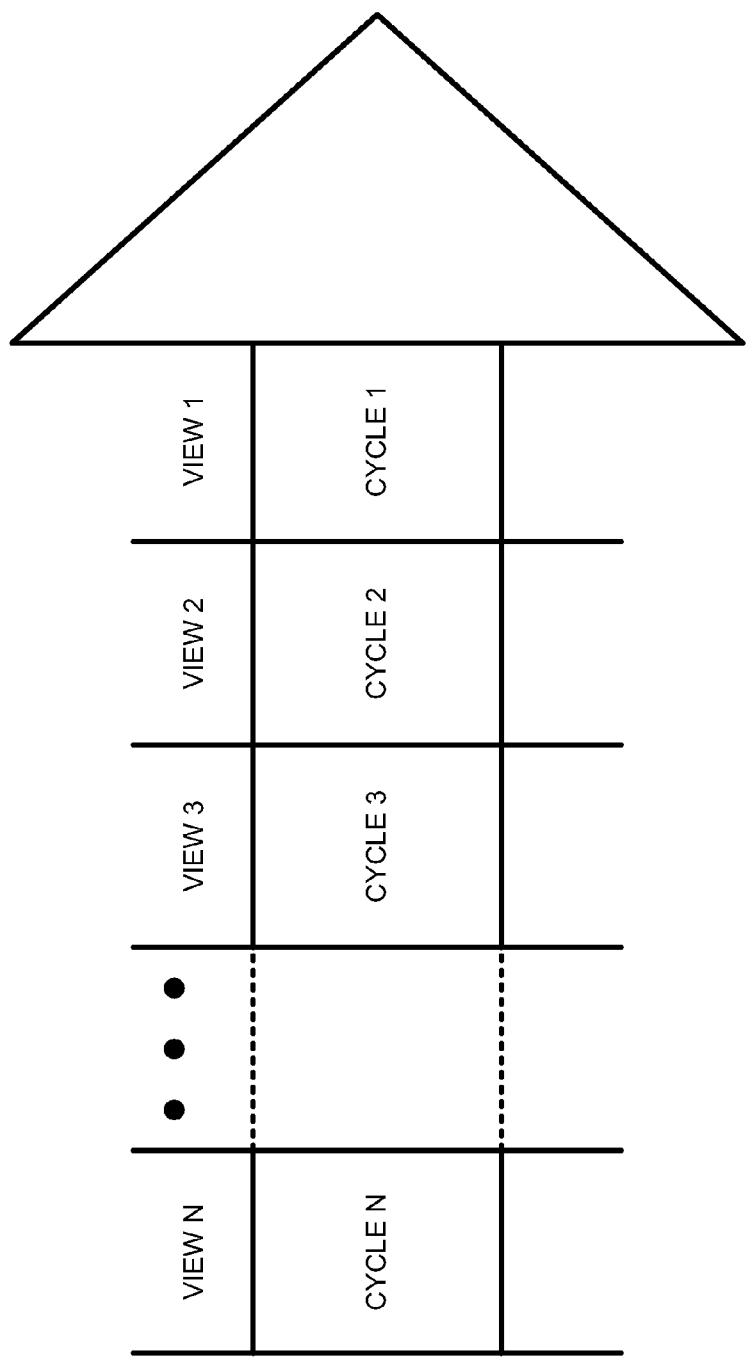
FIG. 5 depicts an exemplary diagram, illustrating utilization of one or more cycles in mail processing, such as in the environments from FIGS. 1 and/or 2.

FIG. 5 depicts an exemplary diagram, illustrating utilization of one or more cycles in mail processing, such as in the environments from FIGS. 1 and 2. As illustrated in this nonlimiting example, mailing data may be received in cycles. As discussed above, many current solutions simply process each cycle individually, without regard to the amount of mail in a particular cycle. Additionally, as much of the time spent in processing (e.g., printing, enclosing, and sending to the post office) occurs during startup and shut down, when a small mail cycle is received, greater inefficiencies are realized. More specifically, the nonlimiting example of FIG. 5 illustrates a first cycle (cycle 1) may correspond with mailing jobs with a deadline of Monday. Cycle 2 may correspond with mailing jobs that have a deadline of Tuesday. Cycle 3 may correspond to Wednesday, and so on. While many current solutions may be configured to process only cycle 1 mail on Monday (or a predetermined time prior to the deadline), embodiments disclosed herein may view more than one cycle at a time, and thus determine the size of cycle 1 to determine whether mail from cycle 2 may be combined with mail from cycle 1. This may have the effect of increasing the size of jobs and reducing the number of jobs to process the mail more efficiently.

Figure 6:
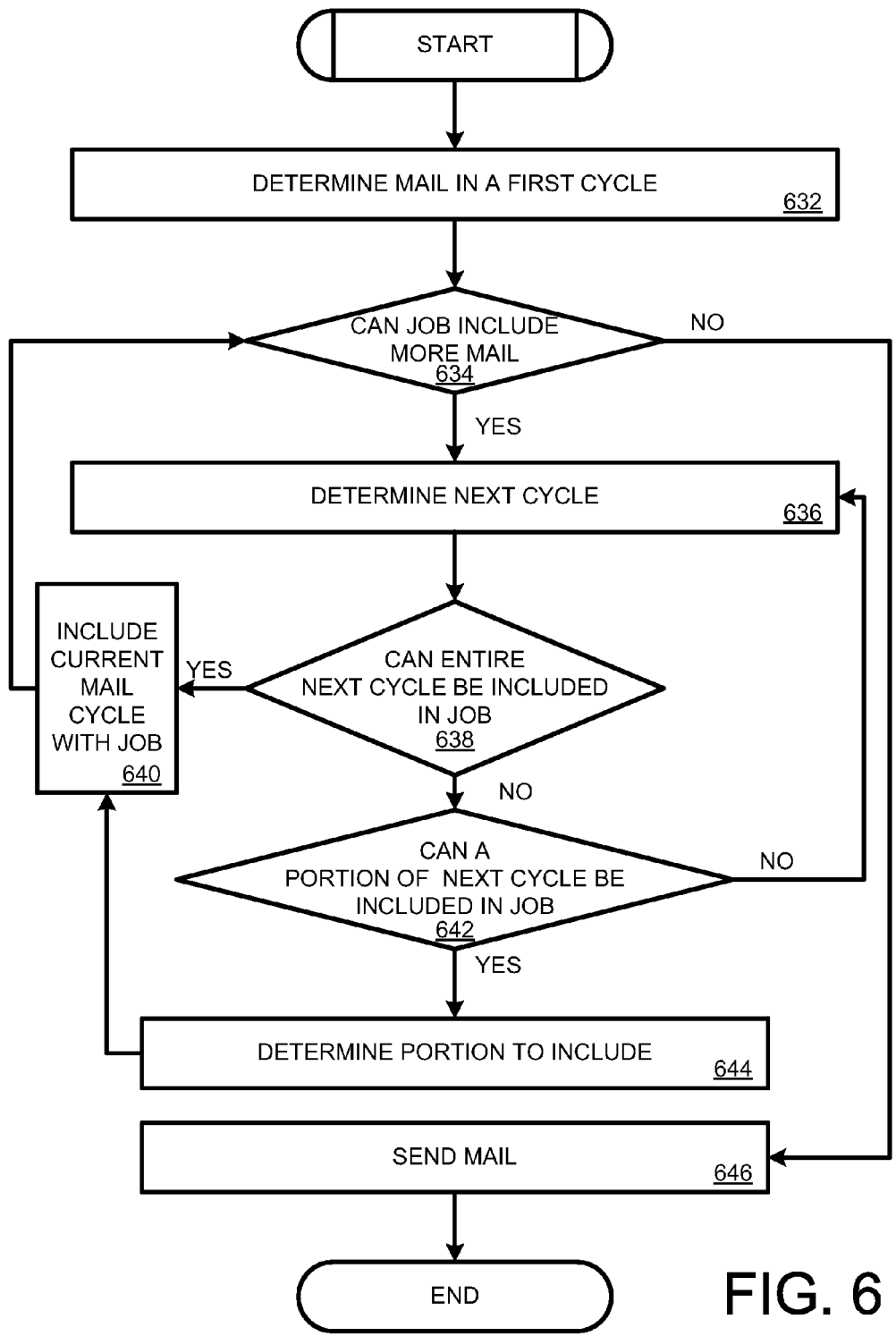
FIG. 6 illustrates an exemplary process that may be utilized for combining one or more cycles for a mail batch, such as in the environments from FIGS. 1 and/or 2.

FIG. 6 illustrates an exemplary process that may be utilized for combining one or more cycles for a mail batch, such as in the environments from FIGS. 1 and 2. As illustrated in the nonlimiting example of FIG. 6, the processing server 106b can determine mail in a first cycle (block 632). More specifically, as a nonlimiting example, the processing server can determine the number of pieces of mail in the first cycle, the type of mail, and/or other data related to the first cycle. The processing server 106b can then determine whether the job can include more mail (block 634). If not, the mail may be processed and sent to the post office (block 646). If however, more mail can be included, the processing server 106b can determine a next cycle (block 636). As a nonlimiting example, determining the next cycle can include determining the number of pieces of mail in the first cycle, the type of mail, and/or other data related to the first cycle. The determination for including additional mail in the current mail batch may be based, not just on traditional commitment dates, but may be based on business rules, including but not limited to load balancing, current bandwidth, current paper inventory, and/or other criteria. The processing server 106b can then determine whether the entire next cycle be included in the job (block 638). If so, the next cycle can be included in the job (block 640) and the process can return to decision block 634. If however, the entire next cycle cannot be included in the job, a determination can be made whether a portion of the next cycle will be included in the job (block 642). If so, the portion to include may be determined (block 644), that portion may be included in the job (block 640), and the process may return to block 634. If however, a portion of the cycle cannot be included in the job, the process can return to block 636 to determine a next cycle (after the previous next cycle).

The embodiments disclosed herein can be implemented in hardware, software, firmware, or a combination thereof. At least one embodiment, disclosed herein is implemented in software and/or firmware that is stored in a memory and that is executed by a suitable instruction execution system. If implemented in hardware, as in an alternative embodiment embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

The invention claimed is:

1. A method comprising:
   determining, at a processing server, a first amount of mail represented by first electronic mail data corresponding to a first mail cycle having a first deadline;
   determining whether additional mail can be added to the first mail cycle based on commitment dates and business rules including load balancing and current bandwidth;
   upon determining that entire mail represented by second electronic mail data corresponding to a second mail cycle cannot be added to the first mail cycle, determining a second amount of mail represented by the second electronic mail data can be added to the first mail cycle, the second amount of mail comprising an amount of mail smaller than the entire mail represented by the second electronic mail data, the second mail cycle having a second deadline different than the first deadline;
   adding the second amount of mail to the first mail cycle; and
   sending third electronic mail data corresponding to mail scheduled for the first mail cycle to an output center to print physical mail based on the third electronic mail data.

2. The method of claim 1, wherein the first deadline is earlier than the second deadline.

3. The method of claim 1, further comprising:
   for a particular piece of the physical mail represented by the third electronic mail data, receiving a determination from the output center of whether the particular piece of the physical mail has been processed.

4. The method of claim 3, further comprising:
   receiving a determination from the output center of whether the particular piece of the physical mail has been received by an intended recipient.

5. A tangible computer readable storage device storing computer program instructions, which, when executed on a processor, cause the processor to perform operations comprising:
   determining a first amount of mail represented by first electronic mail data corresponding to a first mail cycle having a first deadline;
   determining whether additional mail can be added to the first mail cycle based on commitment dates and business rules including load balancing and current bandwidth;
   upon determining that entire mail represented by second electronic mail data corresponding to a second mail cycle cannot be added to the first mail cycle, determining a second amount of mail represented by the second electronic mail data can be added to the first mail cycle, the second amount of mail comprising an amount of mail smaller than the entire mail represented by the second electronic mail data, the second mail cycle having a second deadline different than the first deadline;
   adding the second amount of mail to the first mail cycle; and
   sending third electronic mail data corresponding to mail scheduled for the first mail cycle to an output center to print physical mail based on the third electronic mail data.

6. The tangible computer readable storage device of claim 5, wherein the first deadline is earlier than the second deadline.

7. The tangible computer readable storage device of claim 5, the operations further comprising:
   for a particular piece of the physical mail represented by the third electronic mail data, receiving a determination from the output center of whether the particular piece of the physical mail has been processed.

8. The tangible computer readable storage device of claim 7, the operations further comprising:
   receiving a determination from the output center of whether the particular piece of the physical mail has been received by an intended recipient.

9. An apparatus, comprising:
   a processor; and
   a memory to store computer program instructions, the computer program instructions when executed on the processor cause the processor to perform operations comprising:
   determining a first amount of mail represented by first electronic mail data corresponding to a first mail cycle having a first deadline;
   determining whether additional mail can be added to the first mail cycle based on commitment dates and business rules including load balancing and current bandwidth;
   upon determining that entire mail represented by second electronic mail data corresponding to a second mail cycle cannot be added to the first mail cycle, determining a second amount of mail represented by the second electronic mail data can be added to the first mail cycle, the second amount of mail comprising an amount of mail smaller than the entire mail represented by the second electronic mail data, the second mail cycle having a second deadline different than the first deadline;
   adding the second amount of mail to the first mail cycle; and
   sending third electronic mail data corresponding to mail scheduled for the first mail cycle to an output center to print physical mail based on the third electronic mail data.

10. The apparatus of claim 9, wherein the first deadline is earlier than the second deadline.

11. The apparatus of claim 9, the operations further comprising:
    for a particular piece of the physical mail represented by the third electronic mail data, receiving a determination from the output center of whether the particular piece of the physical mail has been processed.

12. The apparatus of claim 11, the operations further comprising:
    receiving a determination from the output center of whether the particular piece of the physical mail has been received by an intended recipient.

13. The apparatus of claim 9, the operations further comprising:
    prior to sending the third electronic mail data, adding a third amount of mail to the first mail cycle, the third amount of mail represented by electronic mail data corresponding to a mail cycle having a deadline later than the second deadline.

14. The apparatus of claim 13, wherein sending third electronic mail data includes:
determining a number of pieces of physical mail for a mail job based on the third electronic mail data corresponding to mail scheduled for the first mail cycle.

\* \* \* \* \*